United States Patent [19]

Kemmer et al.

[11] 4,089,185
[45] May 16, 1978

[54] HIGH VACUUM PUMP SYSTEM

[75] Inventors: Josef Kemmer, Garching, Germany; Eckhard Kellner, No. 14, Obere Dorfstrasse, 8061 Viehbach, Germany

[73] Assignee: Eckhard Kellner, Viehbach, Germany; a part interest

[21] Appl. No.: 627,398

[22] Filed: Oct. 30, 1975

[30] Foreign Application Priority Data

| Oct. 31, 1974 | Germany | 2451717 |
|---|---|---|
| Aug. 13, 1975 | Germany | 2536006 |
| Aug. 13, 1975 | Germany | 2536005 |
| Nov. 25, 1974 | Germany | 2455712 |

[51] Int. Cl.² ............................................. B01D 5/00
[52] U.S. Cl. ................................. 62/55.5; 55/269; 62/268; 417/901; 427/372 B; 427/376 C
[58] Field of Search ............... 417/901; 62/55.5, 100, 62/268, 269; 55/269, 387, 388, 389; 427/372 B, 376 A, 376 C, 388 R

[56] References Cited

U.S. PATENT DOCUMENTS

| 1,940,707 | 12/1933 | Brown | 427/372 B |
|---|---|---|---|
| 3,137,551 | 6/1964 | Mark | 62/55.5 |
| 3,138,492 | 6/1964 | Perry et al. | 427/372 B |
| 3,175,373 | 3/1965 | Holkeboer et al. | 62/268 |
| 3,262,279 | 7/1966 | Moore, Jr. | 62/55.5 |
| 3,335,550 | 8/1967 | Stern | 62/268 |
| 3,352,122 | 11/1967 | Rothenberg et al. | 62/268 |
| 3,360,949 | 1/1968 | Blanchard et al. | 62/268 |
| 3,364,654 | 1/1968 | Westbrook | 62/268 |
| 3,488,978 | 1/1970 | Della Porta et al. | 62/55.5 |
| 3,616,186 | 10/1971 | Blackwell | 427/388 |
| 3,656,175 | 4/1972 | Phelps, Jr. et al. | 427/372 B |
| 3,936,560 | 2/1976 | Santurri et al. | 427/385 R |

Primary Examiner—Ronald Capossela
Attorney, Agent, or Firm—John C. Smith, Jr.

[57] ABSTRACT

The invention provides a high vacuum pump system of high pumping speed in which the surfaces that are to be cooled are coated with adsorbents in such a manner that it is possible to bale out and activate the coatings at temperatures between 250° and 400° C and then to use them for the maintenance or repeated generation of high vacua containing no hydrocarbons down to pressures as low as about $10^{-8}$ torrs.

18 Claims, 5 Drawing Figures

HIGH VACUUM PUMP SYSTEM

BACKGROUND OF THE INVENTION

This invention relates to a high vacuum pump system of high pumping speed based on the cryo-sorption effect exhibited by adsorbents. The contemplated pump system is capable of evacuating large vessels within a very short time to final pressures of about $1 \times 10^{-7}$ torrs and even less, residual gas atmosphere being entirely free from hydrocarbons.

A number of substances, such as zeolites, alumina or active charcoal, are known to possess very large surfaces of up to 1500 sq.meters/g, which enables them to adsorb large volumes of gases and vapours. At decreasing temperatures the adsorption capacity of these substances, particularly that of active charcoal, increases considerably.

An investigation into the adsorption properties of different active charcoals at 77° K showed that after having been baked out at 100° C they permitted final vacuum pressures of about $10^{-6}$ torrs to be achieved, and that by raising the baking temperature to 350° C the vacuum pressure could be further improved to less than $10^{-8}$ torrs.

On the other hand further cooling of the active charcoal below 77° K to 25° K does not lead to a significant improvement in the obtainable ultimate vacuum pressure. However, at temperatures between 20° and 15° K the condensation and adsorption of neon and hydrogen results in a further lowering of the vacuum pressure. Disregarding for a moment the partial pressures of hydrogen and neon it therefore appears that an active charcoal which has been activated at about 350° C and then cooled to 77° K will allow residual gas pressures between $10^{-7}$ and $10^{-9}$ torrs to be achieved. These are vapour pressures which are comparable with the saturation vapour pressures attainable on cold surfaces at temperatures between 15° and 20° K. Since active charcoals may have surface areas amounting to something like 1500 sq.m./g. it is possible, by providing suitable quantities of active charcoal, to construct cryo-sorption pumps which combine high evacuating speeds with a sufficiently long service life to enable them to be employed in production plant. The activity of the charcoal can be maintained for periods which are the longer the better the fore-vacuum in the vessel that is to be evacuated. The charcoal can be reactivated by baking it out. In cryo-sorption pumps cooling surfaces of between 2 and 4 square meters can be easily provided for supporting quantities of between 500 and 1000 g. of charcoal, the equivalent of providing an active surface of between $0.7 \times 10^6$ and $1.5 \times 10^6$ square meters.

In the case of sorbents hitherto used in vacuum technology thermal contact is usually so poor that neither the baking out temperatures of 300° C required for full activation nor the working temperatures of 77° K can be satisfactorily reached. This applies principally to loose bulk or to bonded sorbents and particularly in the construction of cryostats. Such adsorbents have therefore in the past been used exclusively for the purpose of maintaining residual gas pressures of between $10^{-4}$ to $10^{-6}$ torrs in closed vacuum containers (Dewar flasks) or of generating fore-vacuum pressures of around $10^{-2}$ to $10^{-3}$ torrs (sorption pumps).

SUMMARY OF THE INVENTION

It is the object of the present invention to provide a method of coating surfaces that can be cooled with adsorbents, particularly with active charcoal, in such a way that is possible by establishing good mechanical and thermal contact to bake out and activate such coatings at temperatures between 250° and 400° C and then technically to use them, after they have been cooled to 77° K, for the maintenance or repeated generation of high vacua containing no hydrocarbons down to pressures as low as about $10^{-8}$ torrs.

The invention achieves this object by depositing the sorbent, such as primarily an active charcoal, zeolite or alumina or a mixture thereof, together with a bonding agent, such as nitrocellulose or water glass, on the cooling surfaces of a cryo-sorption pump which may be combined with an ion atomising pump or a titanium vaporising pump.

In detail the method can be carried out in the following different ways:- The granulated or powdered sorbent, particularly active charcoal, is baked out in a vacuum at 300° to 400° C and mixed with powdered copper to improve its thermal conductance. This active charcoal/copper mixture can then be further used as follows:

1. After the cooling surfaces have been coated with a bonding agent such as nitrocellulose or water glass, the baked out active charcoal or the charcoal/copper mixture is applied mechanically or by hand.
2. The active charcoal or charcoal/copper mixture is mixed with nitrocellulose or water glass to form a sorptive lacquer which can be applied to the cooling surfaces by spraying, immersion, or brushing.
3. The active charcoal or the charcoal/copper mixture is impregnated with a solvent or water or with dilute water glass and then mixed with nitrocellulose or water glass to form a sorptive lacquer which is used as in 2.

After having been air dried the coatings produced by the methods 1 to 3 can be activated at about 300° C without impairment of their mechanical strength. Coatings which have been produced with water glass can be baked out at even higher temperatures.

The advantages provided by the invention are that the sorbent coatings can be very easily prepared and that the high baking temperatures of 250° to 400° C which are permissible enable true activation to be achieved. The sorptive coatings are therefore suitable when cooled to 77° K for use as cryo-sorption pumps and adsorb sufficient gas volumes to enable them to be employed in vacuum technology for repeatedly evacuating containers to $10^{-8}$ torrs. These sorbent coatings also have a high sorptive capacity at room temperature. They are therefore also suitable for the production of adsorption filters for gases, vapours and solids.

Owing to the high pumping speed of several $10^3$ liters/second in the pressure range from $10^{-3}$ to $10^{-6}$ torrs, such cryo-sorption pumps make excellent fore-vacuum or backing pumps for ion atomising or titanium vaporising pumps which attain their maximum pumping speeds at $10^{-6}$ to $10^{-9}$ torrs, and which cannot be started at forepump pressures as low as $10^{-3}$ torrs.

The combination of a cryo-sorption pump with an ion atomising or titanium vaporising pump forms a suitable ultrahigh vacuum pumping set for the generation of residual gas pressures of $10^{-7}$ to $10^{-10}$ torrs containing no propellants. Particularly in conjunction with a titanium vaporisation pump a pumping speed for the evacuation of hydrogen can be achieved which is comparable to that of a refrigerator cryopump.

Other advantages are that whilst having a pumping speed and providing ultimate pressures and residual gas compositions comparable with conventional cryopumps, the combination of such a cryo-sorption pump with an ionisation or titanium vaporisation pump is cheaper because the refrigerator can be dispensed with. When an ion atomising pump is used the vacuum gauge is also redundant because its function is then implemented by the mains unit. Owing to the favourable working pressure of $10^{-5}$ to $10^{-9}$ torrs relatively small mains units are sufficient for the ion atomisation or titanium vaporisation pump. Moreover, these pumps develop their peak pumping speed in this precise pressure range and they have a long useful life. The arrangement is also vibration-free, noiseless and not liable to give trouble. The generation of heat is not significant because only liquid $N_2$ is used and the current consumption of the ion atomisation pump is negligible. Moreover, in view of the good vacuum the power consumption of the titanium vaporiser is also low.

Furthermore, for a given intake cross section the effective pumping speed of a cryo-sorption pump is higher than that of a refrigerator cryopump because a baffle is not needed.

Yet another advantage is that the cryo-sorption pump can be employed in several ways, viz.:

1. A cryo-sorption pump alone for evacuating containers without the additional removal of hydrogen.
2. A cryo-sorption pump in combination with an ion atomisation pump for plant calling for the removal of hydrogen and for low ultimate pressures.
3. A cryo-sorption pump in combination with a titanium vaporisation pump or with refrigerator cooling for the removal of large gas volumes, particularly of hydrogen.

By basing the design of the pump on the standard component principle it is possible optionally to change over from one type of arrangement to another when required.

A suitable design of the liquid $N_2$ supply will permit the pump to be mounted in any position.

BRIEF DESCRIPTION OF THE DRAWING

In order that the nature of the invention may be more readily understood non-limiting purely illustrative embodiments be more particularly described and reference made to the drawings, in which.

DESCRIPTION OF THE PREFERRED EMBODIMENTS

Figure 2:
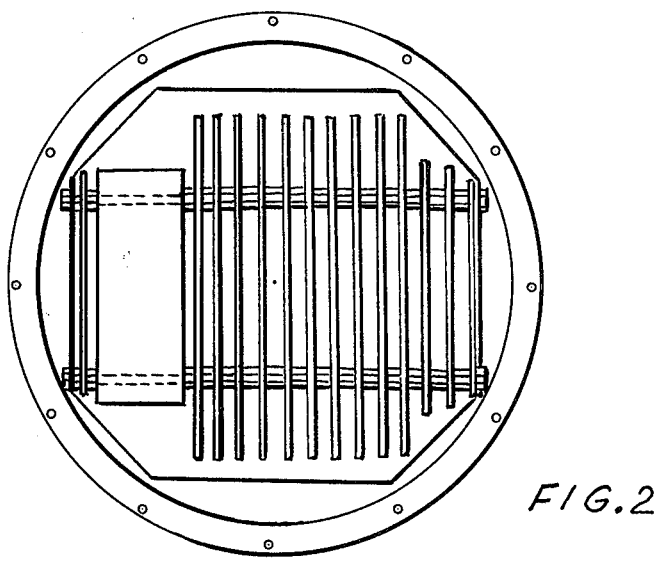
FIG. 2 is a view from below.
Figure 1:
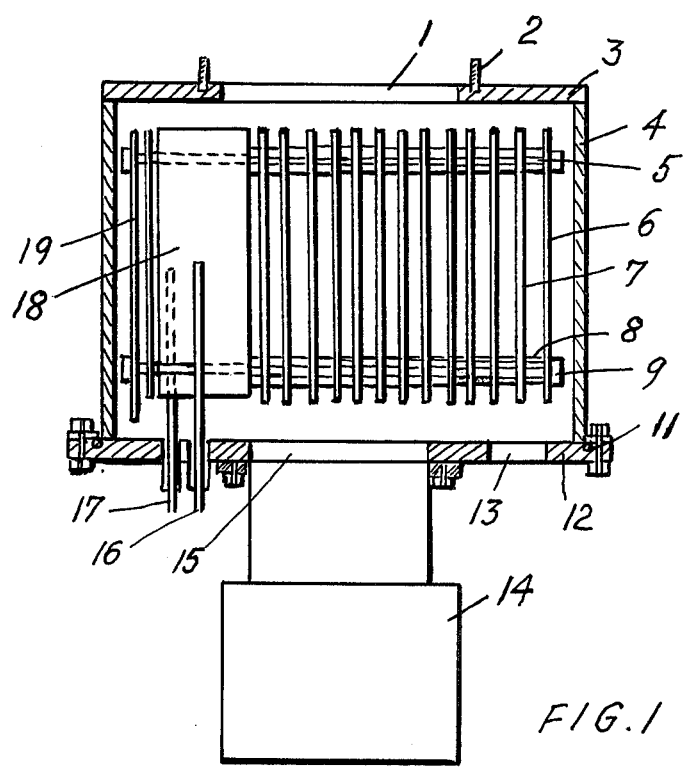
FIG. 1 is a longitudinal section of a pump according to the invention.

Referring to FIGS. 1 and 2 there is provided the body of a pump in the form of a cylindrical vessel 4 made of stainless steel and provided at its ends with a cover 3 and a bottom 12. For connection to vacuum apparatus the upper cover 3 contains an opening 1 surrounded by threaded studs 2. The bottom cover 12 contains a central opening 15 for connection to an ion atomisation pump 14 or to a titanium vaporisation pump, or a refrigerator. Another opening 13 permits a forepump to be connected up. The pump proper consists of a reservoir 18 for liquid $N_2$ coated with a charcoal sorptive lacquer and provided with pipes 17 for the supply of the liquid $N_2$ as well as with a heating cartridge 16. Copper or aluminium plates 7, likewise coated with the charcoal sorptive lacquer, are mounted on four copper rods 5 threadedly fitted into the liquid nitrogen reservoir. These ensure that the plates are satisfactorily cooled. The spacing of the plates is determined by four spacing sleeves 8 interposed between each two neighbouring plates. The entire stack of plates is secured by four screws 9. In order to minimise the consumption of liquid $N_2$ a radiation shield 6 and 19 covers each end of the plate system.

Figure 4:
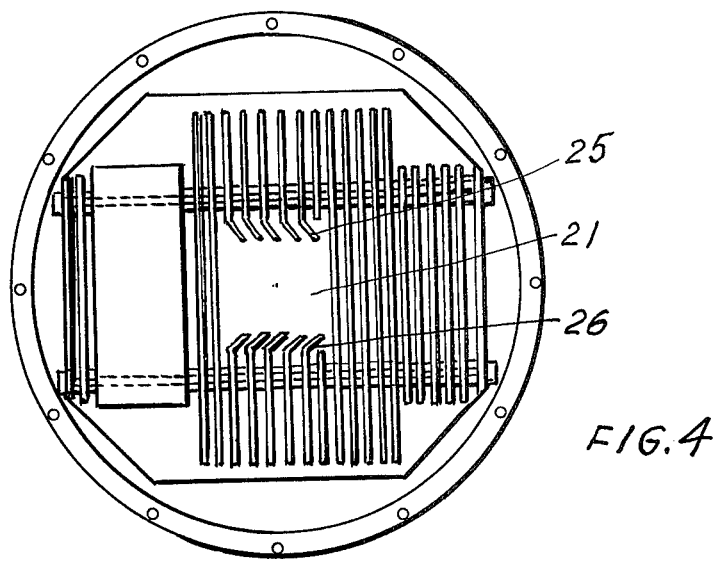
FIGS. 3 to 5 are examples of different applications of the pump.
Figure 3:
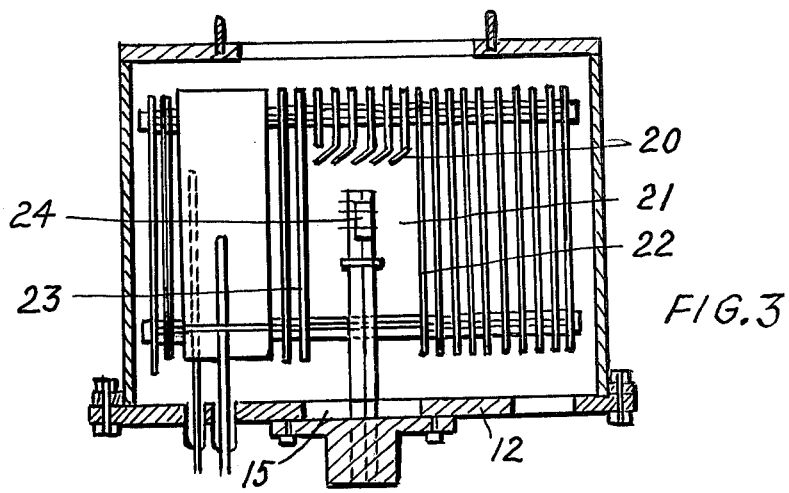

The embodiment illustrated in FIGS. 3 and 4 of the drawings is suitable for combination with a titanium vaporiser 24 or a refrigerator which can be inserted through the opening 15 in the bottom 12 and secured thereto by a flange. A portion of the cryo-sorption surfaces is modified to create an unobstructed space 21 which is screened in the upward direction and on the sides 25, 26 by a kind of baffle. For the condensing surface of the refrigerator as well as for the titanium vaporiser 24 this optically closed form of construction is necessary. When a titanium vaporiser 24 is fitted the cold surfaces 20, 22, 23, 25 and 26 bounding the central space are not coated with the charcoal sorption lacquer because they serve as collecting surfaces for the vaporising titanium.

Figure 5:
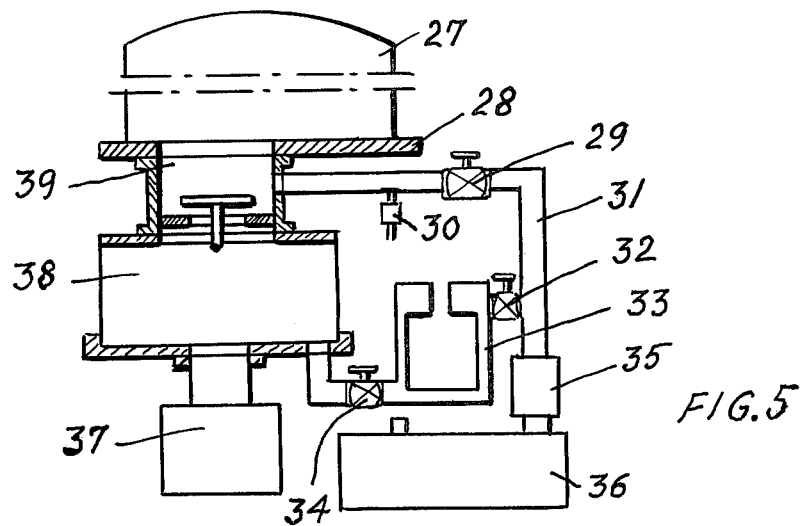

By way of yet another embodiment FIG. 5 illustrates a vaporising equipment which functions as will now be described.

Valves 29 and 39 being closed and valves 32 and 34 open the cryo-sorption pump 38 and the ion atomisation pump 37 are first evacuated through a forevacuum pipe 31. Return flow of oil vapour from the forepump 36 is prevented by an in-line trap 35 or a liquid $N_2$ cold trap 33 which is likewise coated with sorbent lacquer. When the final vacuum pressure has been attained the cold trap 33 as well as the cryo-sorption pump 38 are cooled with liquid $N_2$. Whilst this is being done the valves 32 and 34 may remain open. During cooling to 77° K of the sorption surface which had previously been baked out at 350° C the pressure inside the body of the pump falls from an initial $10^{-3}$ torrs to between $10^{-7}$ and $10^{-8}$ torrs. When the cooling process ends the ion atomisation pump or the titanium vaporisation pump can be started up. The pump system is then ready for operation. For evacuating a container 27 having a base 28 valves 32 and 34 are now closed and valve 29 is opened, a forevacuum of about $10^{-3}$ torrs being generated. This can be checked on a gauge 30. Valve 29 is then reclosed and the high vacuum valve 39 opened. The pressure in the container 27 falls abruptly to between about $1 \times 10^{-6}$ and $5 \times 10^{-7}$ torrs and thereafter continues to drop to values in the $10^{-7}$ to $10^{-9}$ torrs range, depending upon the nature of the evacuated container and the pumping capacity of the ion atomisation pump or the titanium vaporisation pump.

A sealing or metallic packing ring is provided between the shell of the cylindrical vessel 4 and the bottom 12 (FIG. 1).

The invention may be embodied in other specific forms without departing from the spirit or essential characteristics thereof. The embodiments are therefore to be considered in all respects as illustrative and not restrictive.

What is claimed is:

1. A high vacuum pumping system comprising a forepump and a cryo-sorption pump, said cryo-sorption pump comprising
   (a) a closed vessel;
   (b) means for connecting said vessel to a container to be evacuated and said forepump and means detachably connecting said vessel to a cooling device;
   (c) a reservoir for liquid nitrogen, a plurality of plates and heat conductive means detachably mounting said plates in spaced relationship on said reservoir, said reservoir, plates and mounting means being contained in said vessel; and
   (d) the surfaces of said plates being coated with a sorbent selected from the group consisting of zeolite, alumina, active charcoal and mixtures thereof secured to said plates by a water glass bonding agent.

2. A high vacuum pumping system according to claim 1 wherein the surfaces of said plates are coated with powdered copper and said sorbent secured to said plates by a said water glass bonding agent, said powdered copper serving to improve the thermal conductance of said sorbent.

3. A high vacuum pumping system according to claim 1 wherein said cooling device is an ion atomization pump.

4. A high vacuum pumping system according to claim 1 wherein said cooling device is a refrigerator.

5. A high vacuum pumping system according to claim 4 wherein said refrigerator is adjacent said plates within said vessel.

6. A high vacuum pumping system according to claim 5 wherein said plates are arranged in substantially parallel relationship in a row, at least one of said plates intermediate the ends of the row being of shorter length than the remainder of said plates to provide a cavity defined by two of said plates and said shorter plate which cavity contains said refrigerator, the end portion of said shorter plate adjacent said cavity being at an angle with respect to the plane of said shorter plate to provide a baffle.

7. A high vacuum pumping system according to claim 1 wherein said cooling device is a titanium vaporizer.

8. A high vacuum pumping system according to claim 7 wherein said titanium vaporizer is adjacent said plates within said vessel.

9. A high vacuum pumping system according to claim 8 wherein said plates are arranged in substantially parallel relationship in a row, at least one of said plates intermediate the ends of the row being of shorter length than the remainder of said plates to provide a cavity defined by two of said plates and said shorter plate which cavity contains said titanium vaporizer, the end portion of said shorter plate adjacent said cavity being at an angle with respect to the plane of said shorter plate to provide a baffle.

10. A high vacuum pumping system comprising a forepump and a cryo-sorption pump, said cryo-sorption pump comprising
    (a) a closed vessel;
    (b) means for connecting said vessel to a container to be evacuated and said forepump and means detachably connecting said vessel to a cooling device;
    (c) a reservoir for liquid nitrogen, a plurality of plates and heat conductive means detachably mounting said plates in spaced relationship on said reservoir, said reservoir, plates and mounting means being contained in said vessel; and
    (d) the surfaces of said plates being coated with a sorbent selected from the group consisting of zeolite, alumina, active charcoal and mixtures thereof secured to said plates by a nitrocellulose bonding agent.

11. A high vacuum pumping system according to claim 10 wherein the surfaces of said plates are coated with powdered copper and said sorbent secured to said plates by said nitrocellulose bonding agent, said powdered copper serving to improve the thermal conductance of said sorbent.

12. A high vacuum pumping system according to claim 10 wherein said cooling device is an ion atomization pump.

13. A high vacuum pumping system according to claim 10 wherein said cooling device is a refrigerator.

14. A high vacuum pumping system according to claim 13 wherein said refrigerator is adjacent said plates within said vessel.

15. A high vacuum pumping system according to claim 14 wherein said plates are arranged in substantially parallel relationship in a row, at least one of said plates intermediate the ends of the row being of shorter length than the remainder of said plates to provide a cavity defined by two of said plates and said shorter plate which cavity contains said refrigerator, the end portion of said shorter plate adjacent said cavity being at an angle with respect to the plane of said shorter plate to provide a baffle.

16. A high vacuum pumping system according to claim 10 wherein said cooling device is a titanium vaporizer.

17. A high vacuum pumping system according to calim 10 wherein said titanium vaporizer is adjacent said plates within said vessel.

18. A high vacuum pumping system according to claim 17 wherein said plates are arranged in substantially parallel relationship in a row, at least one of said plates intermediate the ends of the row being of shorter length than the remainder of said plates to provide a cavity defined by two of said plates and said shorter plate which cavity contains said titanium vaporizer, the end portion of said shorter plate adjacent said cavity being at an angle with respect to the plane of said shorter plate to provide a baffle.

* * * * *